United States Patent [19]

Frieberg

[11] 4,377,361
[45] Mar. 22, 1983

[54] REVERSIBLE LOCK WASHER

[76] Inventor: Bengt O. Frieberg, La Habra Heights, Calif.

[21] Appl. No.: 180,411

[22] Filed: Aug. 22, 1980

[51] Int. Cl.³ .................................. F16B 39/24
[52] U.S. Cl. .................. 411/161; 411/162; 411/164; 411/188; 411/332
[58] Field of Search .............. 411/114, 115, 136, 137, 411/138, 139, 145, 146, 147, 149, 150, 154, 160, 161, 162, 163, 164, 165, 187, 188, 330, 331, 332, 531

[56] References Cited

U.S. PATENT DOCUMENTS

| 299,287 | 6/1884 | Jordan | 411/160 X |
| 853,005 | 5/1907 | Dawkins | 411/164 |
| 884,933 | 4/1908 | Kesler | 411/115 |
| 889,593 | 6/1908 | Fleischmann | 411/161 |
| 2,102,494 | 12/1937 | Connell | 411/154 X |
| 2,191,101 | 2/1940 | Stellin | 411/161 |
| 2,778,399 | 1/1957 | Mroz | 411/161 |
| 3,352,344 | 11/1967 | Lanius | 411/145 |
| 3,967,083 | 6/1976 | Bould et al. | 411/160 X |
| 4,034,788 | 7/1977 | Melone | 411/165 X |
| 4,134,438 | 1/1979 | Frieberg et al. | 411/163 |

FOREIGN PATENT DOCUMENTS

| 553940 | 2/1923 | France | 411/161 |
| 1003670 | 11/1951 | France | 411/149 |
| Ad.60759 | 7/1954 | France | 411/149 |
| 1255740 | 1/1961 | France | 411/161 |
| 2344742 | 10/1977 | France | 411/161 |
| 154467 | 12/1920 | United Kingdom | 411/161 |

*Primary Examiner*—Thomas J. Holko
*Attorney, Agent, or Firm*—Francis X. LoJacono

[57] ABSTRACT

A reversible lock washer having oppositely disposed cam surfaces adapted for use in combination with a threaded fastener of the type wherein a screw head or nut includes at least one cam surface arranged to engage at least one cam-engaging surface of the reversible lock washer, the cam surfaces of the washer being formed on the inner recessed ring of the washer body. The washer body includes an outer raised peripheral ring having a frictional surface formed on the opposite sides thereof, whereby the washer body is provided with a pair of identical cam and frictional surfaces, thus allowing the washer to be positioned randomly between the engageable cam surface of the nut or screw head and the respective workpiece which is engaged by the frictional surface of the outer peripheral ring, and wherein one arrangement of the nut includes two oppositely disposed reversible cam surfaces, whereby it too can be randomly positioned over the reversible lock washer.

6 Claims, 7 Drawing Figures

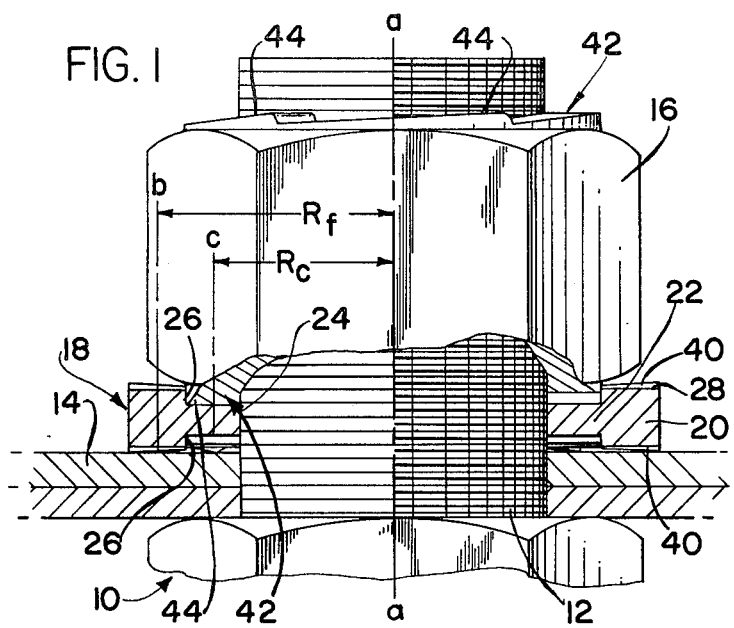
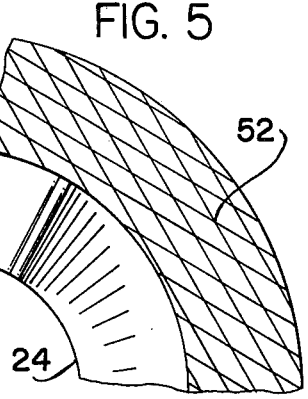
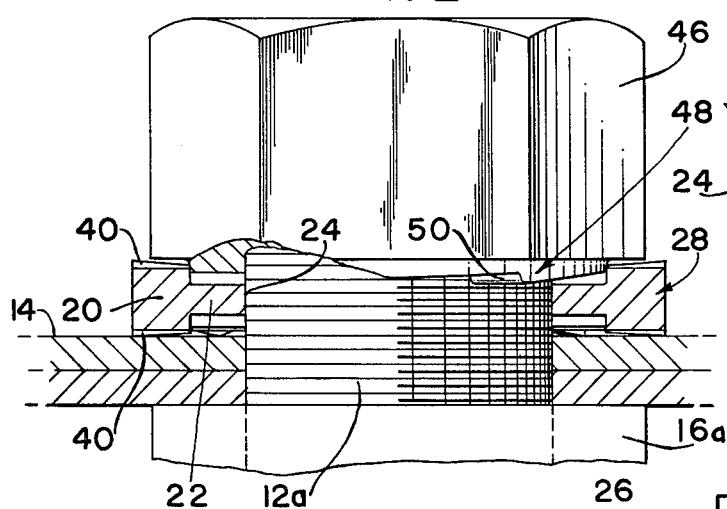
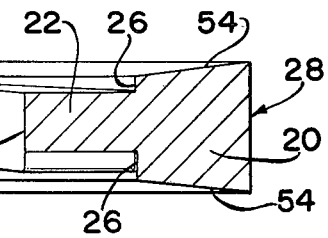
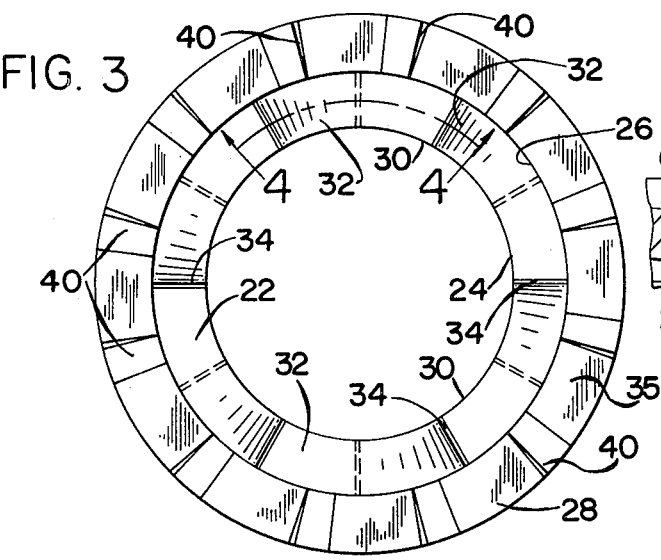
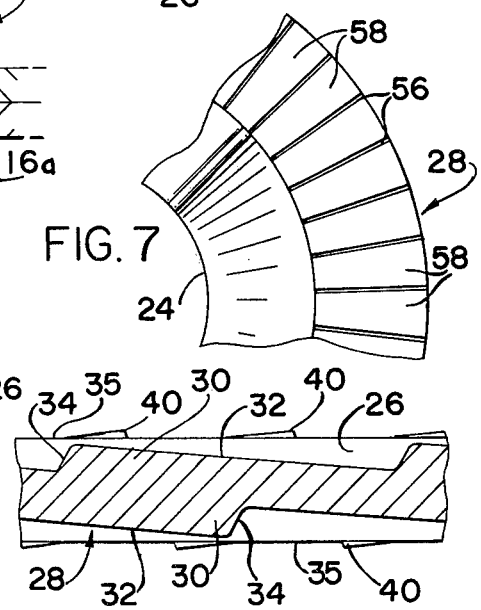

REVERSIBLE LOCK WASHER

BACKGROUND OF THE INVENTION

1. Field of the Invention

This invention relates to locking devices for threaded fasteners, and more particularly to a lock washer having reversible oppositely disposed locking surfaces.

2. Description of the Prior Art

Various problems and difficulties have been and are being encountered with the known lock washers which have a cam-locking surface and an oppositely disposed engaging surface, such as a plurality of radial teeth. Lock washers of this type are generally formed having one surface consisting of a plurality of contiguous cam members, and the opposite surface having a plurality of radially arranged tooth members.

Generally, this type of washer must be used in pairs to provide a working arrangement. Each washer must then be positioned so that the cam surfaces are in opposing engagement with each other, and the toothed surfaces are facing outwardly, so that one toothed surface is positioned to engage the head of a bolt or the nut thereof, and the other toothed surface is positioned to engage the workpiece. This type of washer is disclosed in U.S. Pat. Nos. 3,263,727 and 4,134,438.

Further, a single lock washer of this type is employed wherein the undersurface of a screw head or one surface of the nut includes engaging cam members. Thus, the cam surface of the lock washer will readily engage the opposing cam surface of the head or nut.

However, during assembly of these types of fasteners and lock washers, error in correctly positioning the lock washer becomes a critical problem. The opposing cam surfaces must be positioned correctly for locking engagement; and thus, if a lock washer is inadvertently mispositioned relative to the associated cam surface of another washer or cam nut, a crucial situation between the fastener and its associated workpiece is established, by allowing the fastener to readily loosen and separate from the workpiece.

Hence, with the known-lock washer devices, extreme care must be taken at all times when using them in the assembly of parts or workpieces.

SUMMARY AND OBJECTS OF THE INVENTION

The present invention has for an important object to provide a positive lock washer designed to be readily engageable between a fastener means and a workpiece by having two identical locking sides, wherein each side thereof includes an inner recessed ring formed with a plurality of contiguous cam members, and an outer raised ring defining a frictional surface for engagement with the surface of a workpiece or connecting part.

Thus, the lock washer can be randomly positioned between the fastener and the workpiece, since both sides thereof are identically formed. Therefore, one cam surface of the washer is always positioned for engagement with the cam surface of the opposing cam members formed on the bolt head or nut of the fastener, and one friction surface is always engaging the workpiece surface.

It is another object of the invention to provide a lock washer that is reversible wherein the random positioning thereof will always provide an extended moment arm, whereby the clamping force of the fastener is extended outwardly about the outer, annular, frictional surface for a more positive locking force against the work surface.

A further object of the invention is to provide a reversible lock washer having oppositely disposed and contiguously arranged cams that are recessed within the surface and about the inner peripheral edge of the washer body, thus extending inwardly a width less than the total width of the annular washer body. The recessed cam portion of the washer has an outer diameter that is equal to or greater than the diameter of the engaging cam portion of the fastening means.

Another object is to provide a lock washer of this type wherein the oppositely disposed surfaces of the washer body include an outer raised ring member, defining a frictional portion for engagement with the surface of a workpiece, the frictional portion being disposed about the outer peripheral edge of the washer and extending inwardly thereof to a width substantially less than the total width of the annular washer body, whereby the cam members and the frictional portion are offset from each other. The frictional surface may include a plurality of radially positioned tooth members, a plain, or a continuous knurled surface. The opposing frictional surface may also be tapered outwardly, whereby the outer edge of the frictional ring is thicker than the inner edge thereof.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a cross-sectional view of the present novel lock washer interacting with a double-sided cam-surface nut, the washer being interposed between the nut of the fastener member and the workpiece;

FIG. 2 is a cross-sectional view of the lock washer, showing the screw head having an engaging cam surface;

FIG. 3 is a top-plan view of the present lock washer;

FIG. 4 is an enlarged cross-sectional view taken substantially along line 4—4 of FIG. 3;

FIG. 5 is an enlarged top-plan view of a portion of the washer body having a knurled frictional surface;

FIG. 6 is an enlarged cross-sectional view of the washer, showing a smooth but inclined frictional surface; and FIG. 7 is an enlarged top-plan view of a portion of the washer body having another arrangement of the frictional surface.

DESCRIPTION OF THE PREFERRED EMBODIMENT

Referring more particularly to FIG. 1, there is shown a fastener means, generally indicated at 10, representing the nut-and-bolt-type fastener, having a bolt 12 which is secured to a workpiece or joint member 14 by nut 16. Interposed between the nut 16 and the workpiece 14 is a reversible lock washer, generally designated at 18.

As is well known, this type of fastener is used under various conditions and arrangements wherein vibration may cause loosening of the fastener from a workpiece. In order to prevent such a problem, there is thus provided the present invention which is particularly designed to prevent inadvertent placement of the lock washer. Thus, lock washer 18 is formed having identical sides, allowing the washer to be randomly positioned between the flat surface of the workpiece and the opposing and engaging cam surface of the fastener means.

Accordingly, the reversible lock washer 18 comprises an annular washer body 20 having a first side which includes a cam means and a frictional means, and a second oppositely disposed side which also includes a cam means and a frictional means. The washer body is formed having an inner ring member 22 which defines the central washer opening 24 and an oppositely disposed recess 26, and an outer raised peripheral ring 28.

The cam means of the washer are formed by a plurality of contiguously positioned cam members 30 which are provided on the respective opposite surfaces of the inner ring. This is more clearly shown in the cross-sectional view of FIG. 4. Each cam member 30 includes an elongated inclined cam surface 32 terminating with a front cam-locking face 34, the cam surface being inclined upwardly in a counter-clockwise direction when faced to engage the opposing cam surface of the nut 16. It should be noted that the cam-locking face 34 must be equal to or less than the depth of the recess 26. FIG. 4 shows the leading cam edge below the friction surface 35 of the outer raised peripheral ring 28.

The friction surface as previously mentioned is arranged for engagement with the surface of the workpiece 14. However, the friction surface can be provided in various arrangements and forms. The preferred arrangement of the friction means comprises a plurality of equally spaced tooth members 40 formed on the frictional surface 35. It is contemplated that the apex of each tooth member will be tapered downwardly and inwardly from the outer edge thereof, as seen in FIG. 1. This is in order to provide a greater leverage for the extended moment arm represented by the distance of Rf between the bolt centerline a—a and the line b through the center portion of the outer ring 28. Thus, the clamping force of the fastener is applied to the washer through the action radius represented by Rc of the cam members. That is, Rc is the radius between the centerline a—a and centerline c of the engaging cam members.

As force is applied when tightening the fastener means, the moment arm of the clamping force is transferred outwardly to the outer teeth 40, thereby providing positive locking condition between the bolt and the workpiece.

Nut 16 in FIG. 1 includes a pair of oppositely arranged cam surfaces, generally indicated at 42. Each cam surface is formed with a plurality of cam members 44 and arranged to engage either cam surface of the washer body 20. Thus, nut 16 may also be randomly mounted to bolt 12. That is, either cam surface of the reversible washer 18 is adapted to engage either cam surface of the reversible nut. Thus, one cannot inadvertently miss-match the nut and the washer—which often happens with known lock washers of this type.

Referring to FIG. 2, the fastening means 10 is shown having the head 46 of screw 12a provided with a cam means 48, comprising a plurality of cam members 50. These cam members are also arranged to engage either cam surface of the washer 18, when the washer is interposed between head 46 and the workpiece 14. Thus, as the screw 12a is tightened into a threaded member 16a, the same reaction of the extended moment-arm forces is created as previously described.

It should be noted that various arrangements of the frictional surface may be employed, and examples of these are shown herein. FIG. 5 illustrates a frictional surface being provided with a knurled raised surface 52; whereas in FIG. 6 the frictional surfaces 54 are inclined inwardly from the outer edge of the outer ring 28. Another frictional surface is formed on the outer ring 28, and it comprises a plurality of grooves 56 which define radial ribs 58.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A reversible lock washer in combination with a threaded fastener having at least one matching cam surface, said lock washer comprising:
    an annular washer body having an outer peripheral ring member and an inner peripheral ring member, said inner ring member defining a central opening in said washer body;
    said washer body being formed having oppositely arranged engaging surfaces;
    each engaging surface including oppositely disposed inner annular recesses, the width of each of said recesses being less that the total width of said washer body, thereby defining said inner and outer peripheral ring members;
    cam means formed on each opposite side of said inner ring member for matching engagement with said cam surface of said fastener;
    wherein said cam means of said washer comprises a plurality of contiguously arranged cam members formed on said opposite sides of said inner ring member and disposed in said respective recesses, the height of said cam members being equal to or less than the depth of said recesses;
    said fastener comprising a nut having at least one cam surface formed thereon and positioned to engage said recessed cam members of said washer body, said recessed cam members being arranged in a counter-clockwise direction when faced to engage said opposing cam surface of said nut; and
    frictional means formed on each opposite side of said outer ring member, whereby the axial force applied by said fastener is transmitted from said inner ring member to said outer ring member, thereby establishing an outwardly extended moment arm.

2. A reversible lock washer in combination as recited in claim 1, wherein said fastener comprises a nut having a pair of oppositely arranged cam surfaces for random engagement with said recessed cam members of said washer body.

3. A reversible lock washer in combination as recited in claim 2, wherein said frictional means comprises a plurality of radially disposed teeth members formed on the surfaces of said sides of said outer ring member.

4. A reversible lock washer in combination as recited in claim 3, wherein said teeth members are inclined downwardly and inwardly from the outer edge of said outer ring member.

5. A reversible lock washer in combination as recited in claim 2, wherein said frictional means comprises a substantially flat surface inclined downwardly and inwardly on each side of said outer ring member.

6. A reversible lock washer in combination with a threaded fastener having at least one matching cam surface, said lock washer comprising:

an annular washer body having an outer peripheral ring member and an inner peripheral ring member, said inner ring member defining a central opening in said washer body;

said washer body being formed having oppositely arranged engaging surfaces;

each engaging surface including oppositely disposed inner annular recesses, the width of each of said recesses being less than the total width of said washer body, thereby defining said inner and outer peripheral ring members;

cam means formed on each opposite side of said inner ring member for matching engagement with said cam surface of said fastener;

wherein said cam means of said washer comprising a plurality of contiguously arranged cam members formed on said opposite sides of said inner ring member and disposed in said respective recesses, the height of said cam members being equal to or less than the depth of said recesses;

said fastener comprising a screw having a head member, said head member including a cam surface for matching engagement with said recessed cam members of said washer body, said recessed cam member being arranged in a counter-clockwise direction when faced to engage said opposing cam surface of said screw-head member; and frictional means formed on each opposite side of said outer ring member, whereby the axial force applied by said fastener is transmitted from said inner ring member to said outer ring member, thereby establishing an outwardly extended moment arm.

* * * * *